United States Patent [19]
Platti

[11] Patent Number: 4,955,925
[45] Date of Patent: Sep. 11, 1990

[54] RAKER TAKER I

[76] Inventor: Rita J. Platti, 8041 Mariners Dr., (Apt. #3810), Stockton, Calif. 95209

[21] Appl. No.: 406,454

[22] Filed: Sep. 13, 1989

[51] Int. Cl.⁵ .......................... A47L 13/52; B65D 5/00
[52] U.S. Cl. .................................. 15/257.6; 15/257.9; 15/257.1; 229/123; 229/183; 229/185; 229/117.01
[58] Field of Search ................. 15/257.6, 257.7, 257.9, 15/257.1; 206/83.5, 526, 527; 229/117, 123, 183, 185, 117.01

[56] References Cited

U.S. PATENT DOCUMENTS

| | | | |
|---|---|---|---|
| 435,251 | 8/1870 | Schumacher | 15/257.6 |
| 3,469,762 | 9/1969 | Toure | 15/257.6 |

Primary Examiner—Henry J. Recla
Assistant Examiner—David J. Walczak

[57] ABSTRACT

The Raker Taker is basically a box which opens its sides with winged bottoms, lifts its top for further openness, and lowers its front to increase flat area for raking. The sides open easily and are held and guided by diagonal rods above and below the bottom of the box. The sides swing off of the back on hinges. Likewise, the top is raised from the back, and the front lowered, on hinges. Handles are optional, but help with lifting the box. Thus handles are shown on the top, front and sides of the box. The closing of the box tend to compact the material gathered. The box is designed to open easily, close easily, carry easily and dump easily. The box may vary in size to suit the needs of the gardener. Also, some variation in shape and detail may be made as long as the essence and the purpose of the box is there, namely to assist the raking gathering of the debris.

1 Claim, 3 Drawing Sheets

RAKER TAKER I

BACKGROUND OF THE INVENTION

It would be very practical for the ordinary yard worker to have a convenient container to rake into directly. The container opens up yet stays relatively flat on the ground so that leaves and yard debris could be raked on to the flat section. When a reasonable amount of debris has been raked on, the container is then closed up. This may then be of further practical value. The "closing" of the container acts somewhat as a compactor of the gathered material. The top and the front of the container are then secured. Then for further convenience, the container end is opened for dumping the debris into the disposable bag or other main debris container. A real feature of this Raker Taker is that it may vary in size and shape. For any raking in tight or close areas, a small Raker Taker would be great. For larger areas like the front lawn, a larger Raker Taker would be appropriate. Up to now, it seems that putting the leaves and debris into a container is more work. The compacting and the dumping are also simplified with the Raker Taker.

SUMMARY OF THE INVENTION

A simple container which remains flat on the ground has a design so that it opens up to form a wider flat area. The object of this is so that a yard worker may rake on to the flat area directly. After raking, it is closed and then provided with a top and an end which secure the container in its closed position. In the process of closing the sides, the yard debris is somewhat compacted. The end could then be opened for convenient dumping. This is simply a container with a bottom, two sides that may be expanded to desired open position, a back to the container, a top and a front end designed to secure the closed position of the opening wings, and a handle for easy lifting. Very helpful for easy raking! Different sizes and even variation in shapes could be made to suit the particular needs of the situation.

DESCRIPTION OF THE PREFERRED EMBODIMENT

Figure 1:
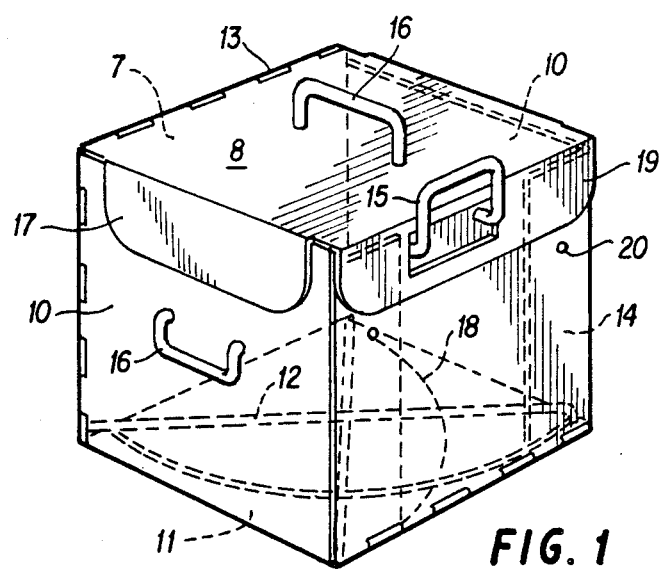
FIG. 1 is an isometric view of The Raker Taker in closed position.

This invention will be referred to as a box in this description. The back of said box is referred to generally in FIG. 1, 2, and 5 by the reference numeral 7.

The top of said box is referred to generally in FIG. 1, 2, 5, & 8 by the reference numeral 8.

The front of said box is referred to generally in FIG. 1, 2, 7, & 8 by the reference numeral 9.

Figure 2:
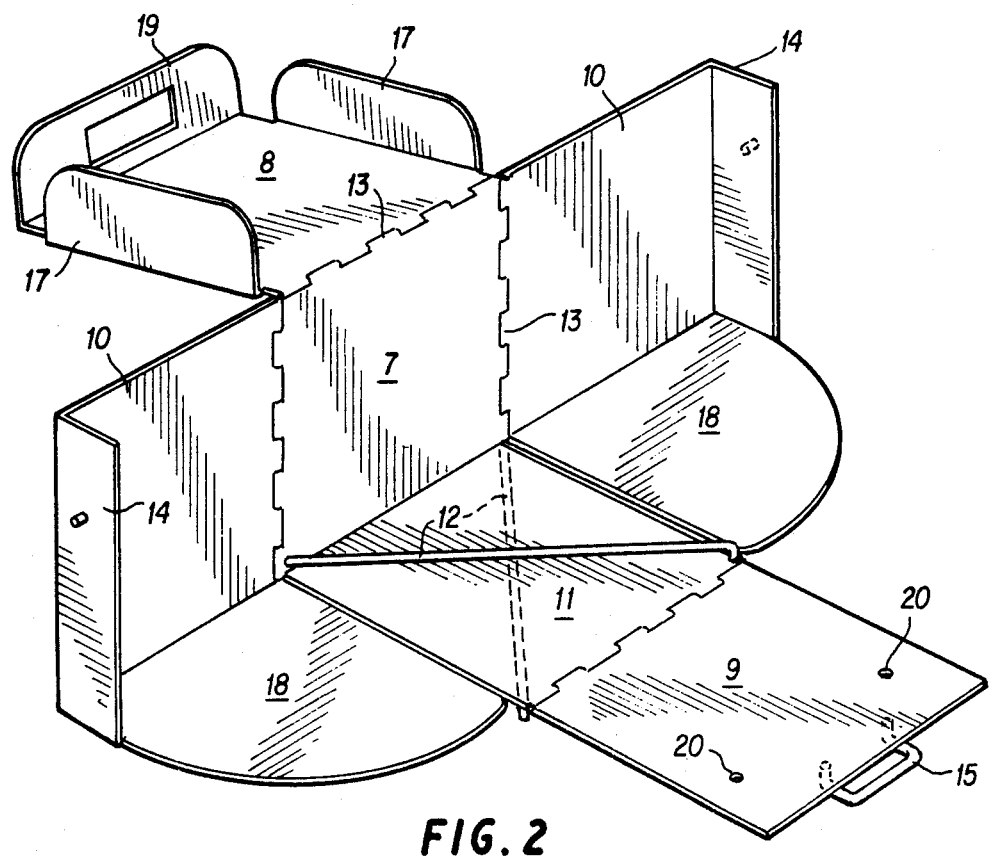
FIG. 2 is an isometric view in open position.

The sides of said box are referred to generally in FIG. 1 and 2 by the reference numeral 10.

The bottom of said box is referred to generally in FIG. 1, 2, 3, & 4 by the reference numeral 11.

The guide rails of the bottom of said box are referred to generally in FIG. 1, 2, 3, & 4 by the reference numeral 12.

The hinges of said box are referred to generally in FIG. 1, 2, & 5 by the reference numeral 13.

The front flaps at right angles from the vertical sides of said box are referred to generally in FIG. 1, 2, & 6 by the reference numeral 14.

The handle on the front of said box is referred to generally in FIG. 1, 2, & 8 by the reference numeral 15.

The top and side handles of said box are referred to generally in FIG. 1 and 2 by the reference numeral 16.

The top of said box has side flaps referred to generally in FIG. 1 & 2 by the reference numeral 17.

The flat bottom opening parts, one on each side, of said box are referred to generally in FIG. 1, 2, 3, & 4 by the reference numeral 18.

The front top flap of said box showing the hole for the front handle to go through, is referred to generally in FIG. 1, 2, & 8 by the reference numeral 19.

The two holes in the front of said box are referred to generally in FIG. 1, 2, & 7 by the reference numeral 20.

This Raker Taker or box as it will be called, has a very simple practical value as a garden box. It has the general shape of a box. However, the top lifts up, the front falls forward, and the sides both fan out with flat wings. The object of this is to provide a simple method of having a wide flat area on which to rake leaves, etc. Then because of the simplicity of the design, the sides fold in after the raking. This sort of compacts the debris itself. The top, front and sides are secured. Then the box is equally convenient to carry in a compact way. Also, when dumping into another container, the very nature of the opening front, lifting top, and expanding sides, all make the dumping very easy.

Figure 3:
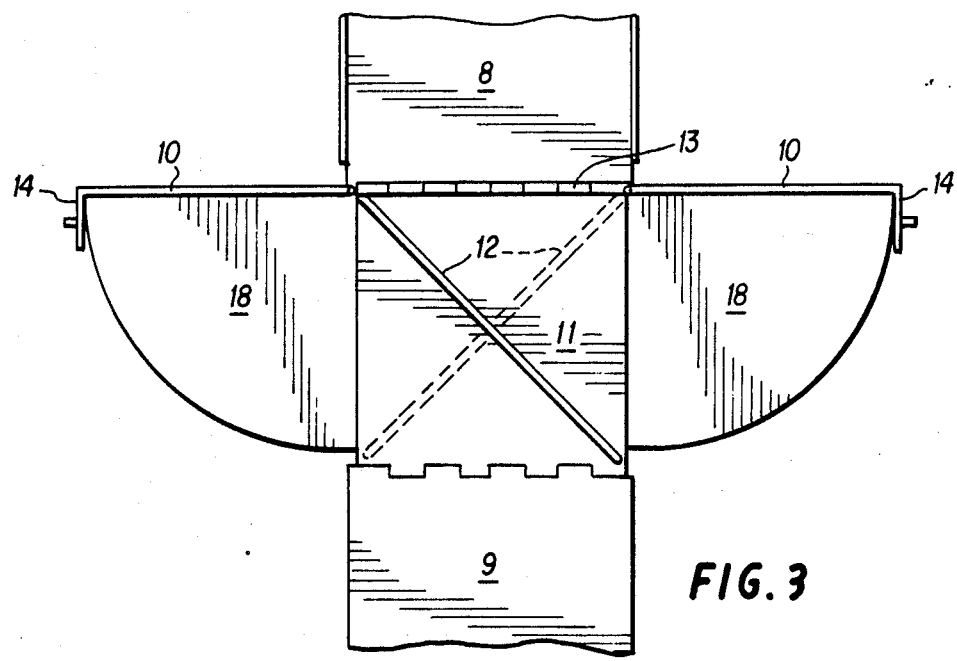
FIG. 3 is a top view of opening bottom flap with reference numeral 18 in open position.
Figure 4:
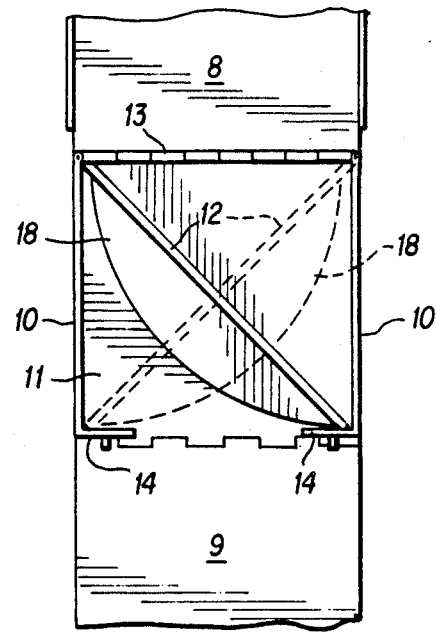
FIG. 4 is a top view of opening bottom flap in closed position.

To describe the box itself in more detail, the back 7 and the bottom 11 are the main so-called "stationary" parts of said box. Also, the bottom 11 has one diagonal flat part above it, and one below it. These diagonal pieces are part 12. If the box is made of plastic, the parts 12 are simply made as part of the bottom. However, if other materials are used, simple screws, bolts or even rivets would secure them. These parts 12 guide the bottom wings 18 and keep them in place. Parts 12 also act as a strengthening brace to the bottom 11. One of these flat diagonal parts 12 is above the bottom 11 and one is below. The purpose of this is that when opening and closing the wings 18 the movement does not cause any interference with each other or with the bottom 11. Also the end of these flat guide rails 12 are designed so that when part 18 is fully opened, the expansion is stopped at the front tip of 12. FIG. 3 shows this. FIG. 3 & 4 illustrate the opening and closing of part 18.

Figure 6:
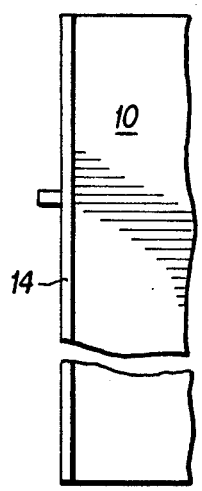
FIG. 6 is a side view of the side flaps including front pin.
Figure 7:
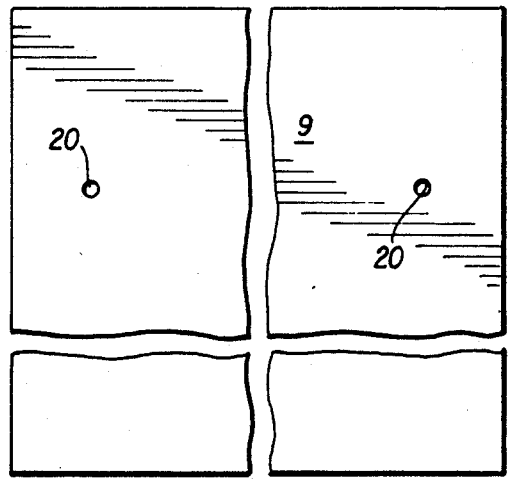
FIG. 7 is a front view of detail with reference numeral 20 on front of box.
Figure 8:
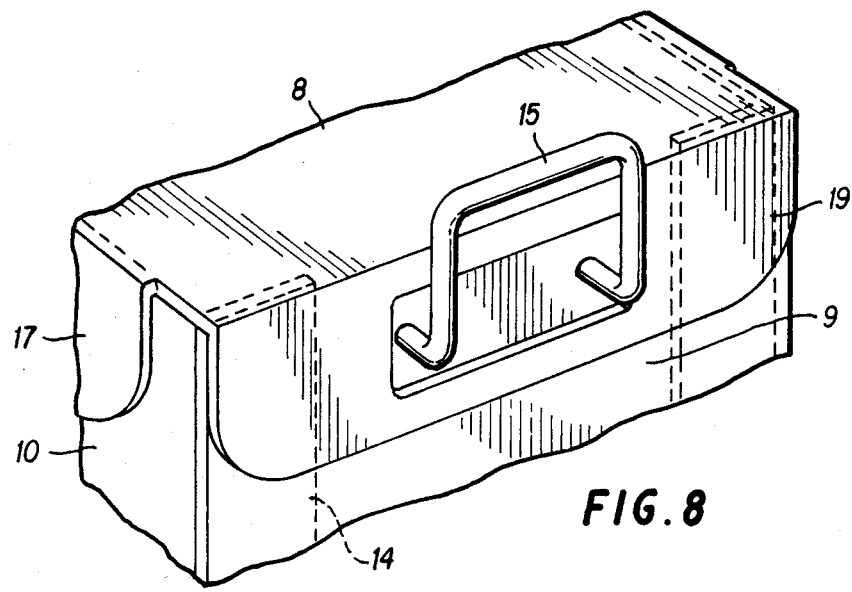
FIG. 8 is an isometric view of the top flap as it joins the front of the box.

As for the rest of the box, some of the details are obviously optional. For example, the sides 10 have at right angles off of them part 14. These parts 14 act as a stabilizer and could if wanted be provided with a small protruding pin such as shown in FIG. 6. This pin on said part 14 is not really necessary, but it does fit into the hole on each side of the front 9. Thereby snapping it into place secures the sides. FIG. 1, 2, 6, & 7 may be referred to here. The holes are referred to as 20.

The flat winged parts 18 are curved so that they may be pulled in and out and the bottom 11 and the two diagonal parts 12 are loose enough for easy movement, yet tight enough for strength and guidance.

Figure 5:
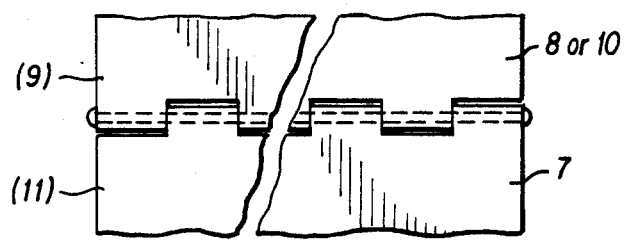
FIG. 5 is a top angled view of the hinge detail.

The top 8 is hinged off of the back 7 using detail shown in FIG. 5. The same hinging idea is used to join bottom 11 to front 9, and back 7 to sides 10. Actually, with certain materials, hinges are not really needed to perform this opening and closing action.

The front 9 has an interesting function in the design of the box. It does provide an added flat area on which to rake. It also directs traffic on the flat wings 18 because it does hold the diagonals 12. Then when the sides 10 and wings 18 are in closed position, the parts 14 with the pins arrive. Those holes in matching position fit right over those little pins and provide a needed security, while the gardener has yet to lower the top 8 with its further security parts 17 and 19. Then, last but not least, the front has another practical function. Not only does it have a handle 15, but this 15 acts not just as a handle, but fits right into the front top 19 opening after it is brought down for final closing of the box. Thus the handle secures the top to the front. Please refer to FIG. 1, 2, 5, 6, 7, & 8.

The handles, one on each side, 16, one on the top, 16, and one fitting into the top 19, (this handle is referred to as 15), all of these handles would be simply made as part of the original product if plastic is the material used for this box. However, if other materials are used, then these handles could be secured by a number of simple practical methods such as screws, bolts, rivets, or other. It would be simpler to use built-in handles, hinges and rods if material allows it.

The top 8 has two sides 17 at right angles to 8. It also has the front flap 19 provided with the hole in it to fit over the front 9 and through the hole in 19 will go the handle 15. The box is then fairly well secured for the gardener to pick up and carry away.

I claim:

1. A leaf collecting device comprised of top, bottom, front, back, and two side walls; said bottom wall having upper and lower surfaces; each of said front, back and side walls including top, bottom and side edges; said top and bottom walls including front, back, and two side edges;
    first and second hinge means which enables the device to be placed in an open or closed position; said first hinge means hinges said back edge of said back wall to said back edge of said top wall and said side edges of said back wall to one of said side edges of said side walls and said second hinge means hinges said front edge of said bottom wall to said bottom edge of said front wall;
    flaps located at said bottom edge of each of said side walls and adapted to extend orthogonally therefrom;
    a first guide rail extending diagonally across said upper surface of said bottom wall;
    a second guide rail extending diagonally across said lower surface of said bottom wall; said guide rails being adapted to receive said flaps in order to secure said side walls to said bottom wall;
    side flanges located at the other of said side edges of said side walls adapted to extend orthogonally therefrom to overlap said front wall; each of said side flanges having a protruding pin thereon;
    holes in said front wall positioned to receive said pins when said flanges overlap said front wall;
    a handle located at the front wall;
    top flanges located on said front and side edges of said top wall and adapted to extend orthogonally therefrom to overlap said front and side walls; said top flange located at said front edge of said top wall includes a hole positioned to receive said handle when said flange overlaps said front wall.

* * * * *